Feb. 16, 1971    L. B. BURGIN    3,564,531
BLADE ANGLE CONTROL DEVICE
Filed July 24, 1967    2 Sheets-Sheet 1

Luther B. Burgin
INVENTOR.

BY *Clarence A. O'Brien*
and *Harvey B. Jacobson*
Attorneys

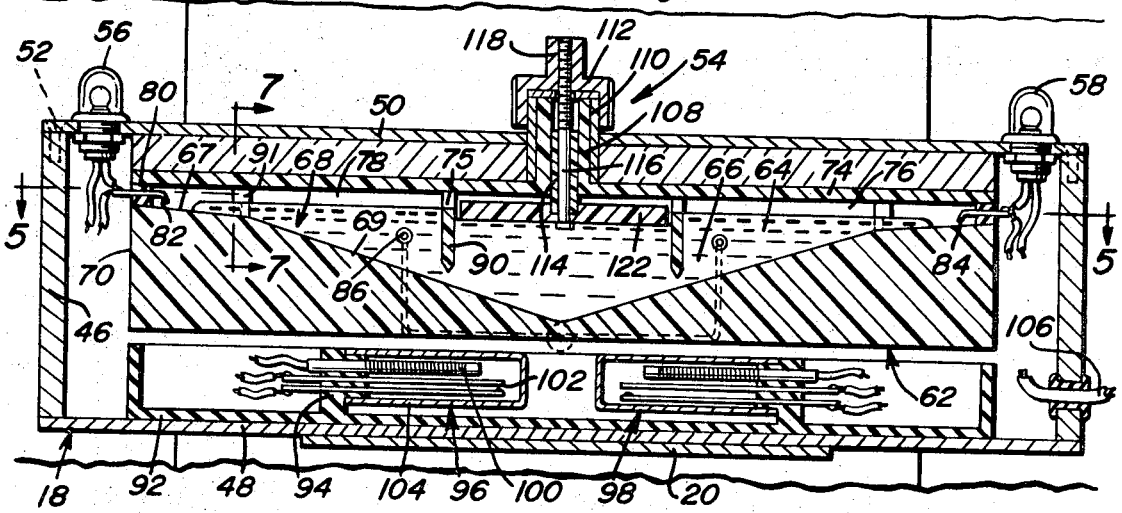
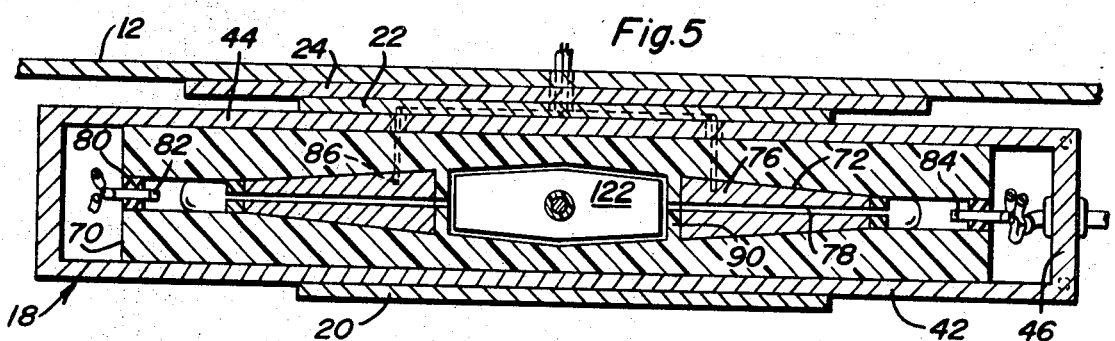
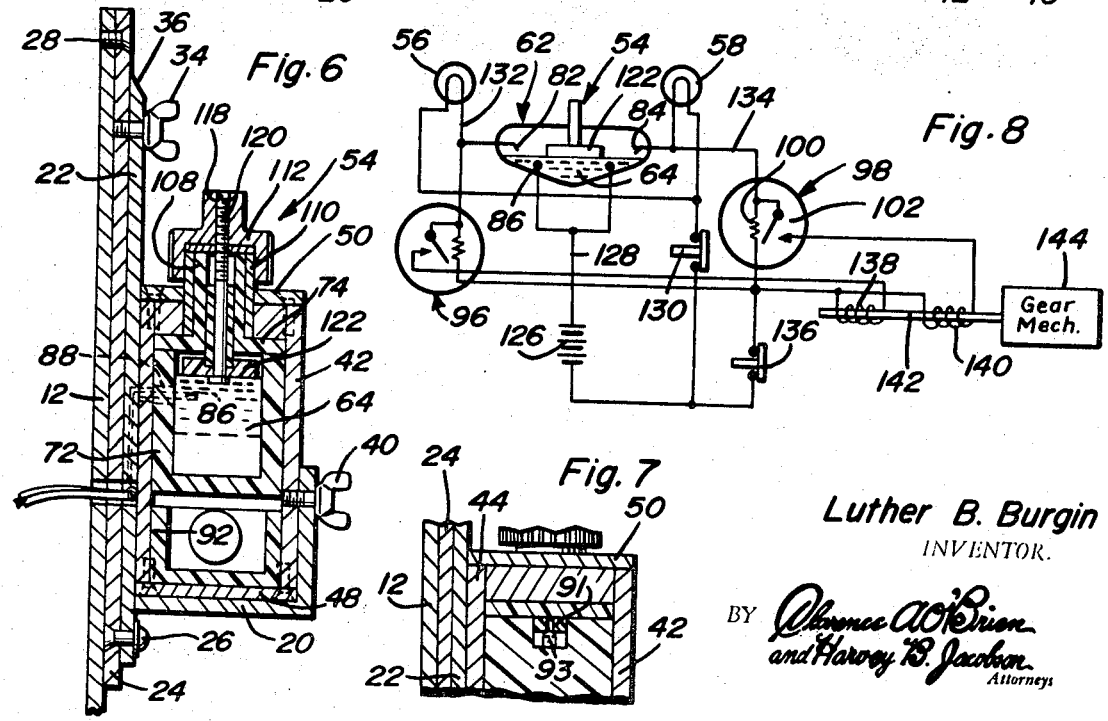

United States Patent Office 3,564,531
Patented Feb. 16, 1971

3,564,531
BLADE ANGLE CONTROL DEVICE
Luther B. Burgin, P.O. Box 958,
Poplar Bluff, Mo. 63901
Continuation-in-part of application Ser. No. 572,143,
Aug. 12, 1966. This application July 24, 1967, Ser.
No. 659,284
Int. Cl. G08b 21/00
U.S. Cl. 340—282    11 Claims

ABSTRACT OF THE DISCLOSURE

A body of mercury, the movement of which is dampened by baffles, establishes a conductive path between contacts within a chamber the position of which reflects tilting of a grading blade of automatically correct the position of the blade. The sensitivity of the device is varied by adjusting the position of an element partially submerged in the mercury.

---

This application is a continuation-in-part of my prior copending application, U.S. Ser. No. 572,143, filed Aug. 12, 1966, now abandoned.

This invention relates to a position sensing device for grading blades or the like through which corrective control may be exercised over the blade positioning mechanism.

A primary object therefore of the present invention is to provide a position sensing device and associated control particularly adapted for controlling the vertical angle of a grading blade, the position sensing device being easily installed, reliable in operation and adjustable in accordance with different requirements.

In accordance with the foregoing object, the position sensing device of the present invention features a liquid containing chamber for a conductive liquid such as mercury through which an electrically conductive path is established between contacts when the device is displaced from a horizontal position. The shape of the liquid containing chamber is designed so as to render the position sensing device reliably responsive to tilting or angular displacement of the blade on which the device is mounted by amplifying displacement of the body of liquid in the plane in which the device is angularly displaced.

An additional object of the present invention is to provide a position sensing switch device containing a body of conductive liquid within a chamber provided with longitudinally spaced baffles preventing splashing of the liquid because of movement of the vehicle in which the device is mounted.

A further object of the present invention in accordance with the foregoing objects is to provide a position sensing switch device embodying time delay relay components through which operation of reversible controls in response to signals from the position sensing device is delayed in order to avoid premature and excessive corrective movement.

A still further object of the present invention is to provide in connection with the aforementioned position sensing device, a sensitivity selector which is operative to vary the space occupied by the body of conductive liquid within its chamber in order to change the spacing between the liquid body and the open contacts.

Yet another object of the present invention is to provide a position sensing switch device provided with directional indicators which signify establishment of a directional signal by the position sensing device.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 4 is an enlarged sectional view taken substantially through a plane indicated by section line 4—4 in FIG. 3.

FIG. 5 is a sectional view taken substantially through a plane indicated by section line 5—5 in FIG. 4.

FIG. 6 is a transverse sectional view taken substantially through a plane indicated by section line 6—6 in FIG. 3.

FIG. 7 is a partial transverse sectional view taken substantially through a plane indicated by section line 7—7 in FIG. 4.

FIG. 8 is an electrical circuit diagram associated with the position sensing device of the present invention.

Figure 1:
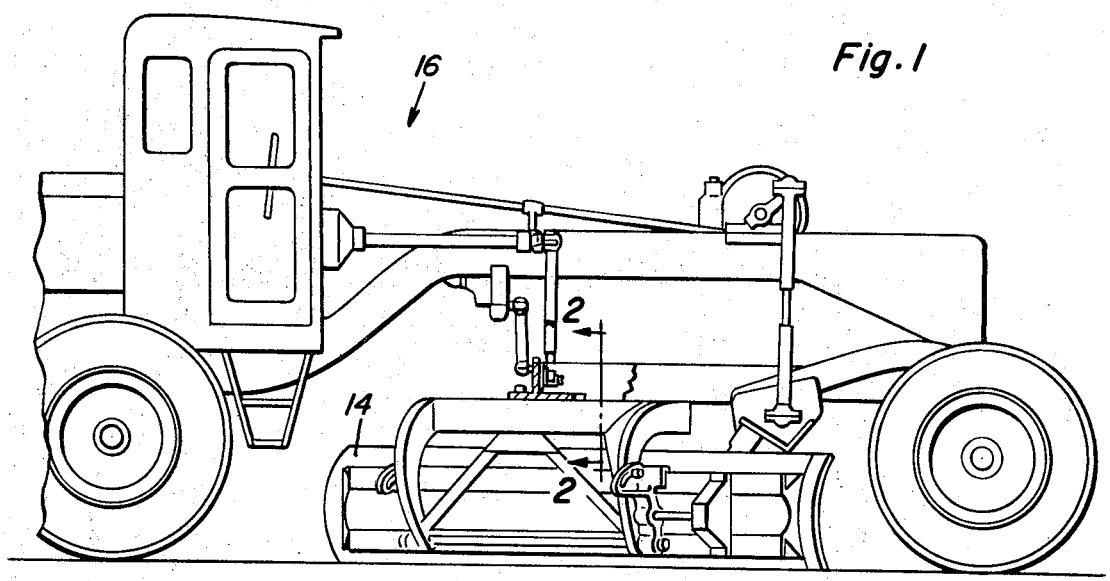
FIG. 1 is a side elevational view of a typical road grader showing one installational environment for the position sensing device of the present invention.
Figure 2:
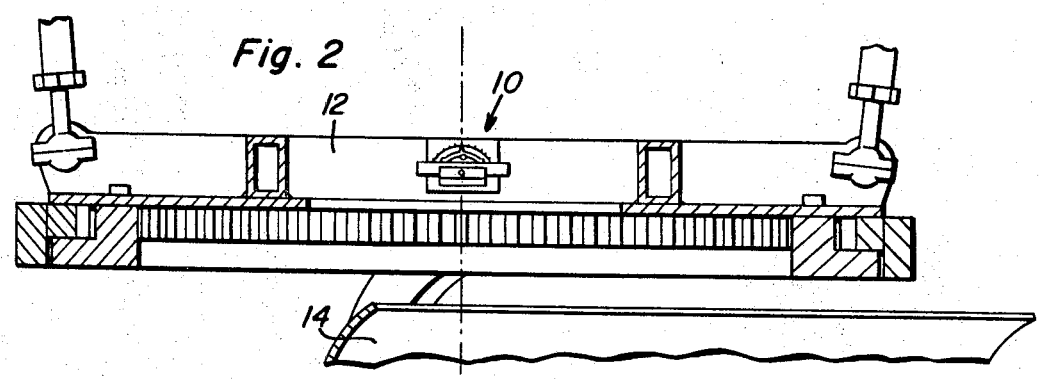
FIG. 2 is an enlarged partial sectional view taken substantially through a plane indicated by section line 2—2 in FIG. 1.

Referring now to the drawings in detail, FIGS. 1 and 2 illustrate by way of example only, a typical installation for the position sensing device of the present invention generally denoted by reference numeral 10. As illustrated, the position sensing device 10 is mounted on a blade mounting member 12 through which a grader blade 14 is angularly adjusted by means of the blade positioning mechanism associated with the road grader generally referred to by reference numeral 16. It will of course be appreciated, that the positioning device 10 may be mounted on other types of equipment but in each case, it is operative to sense angular displacement or tilting in one plane in order to establish control signals for correctively operating the positioning mechanism in order to restore the blade to its adjusted position.

Figure 3:
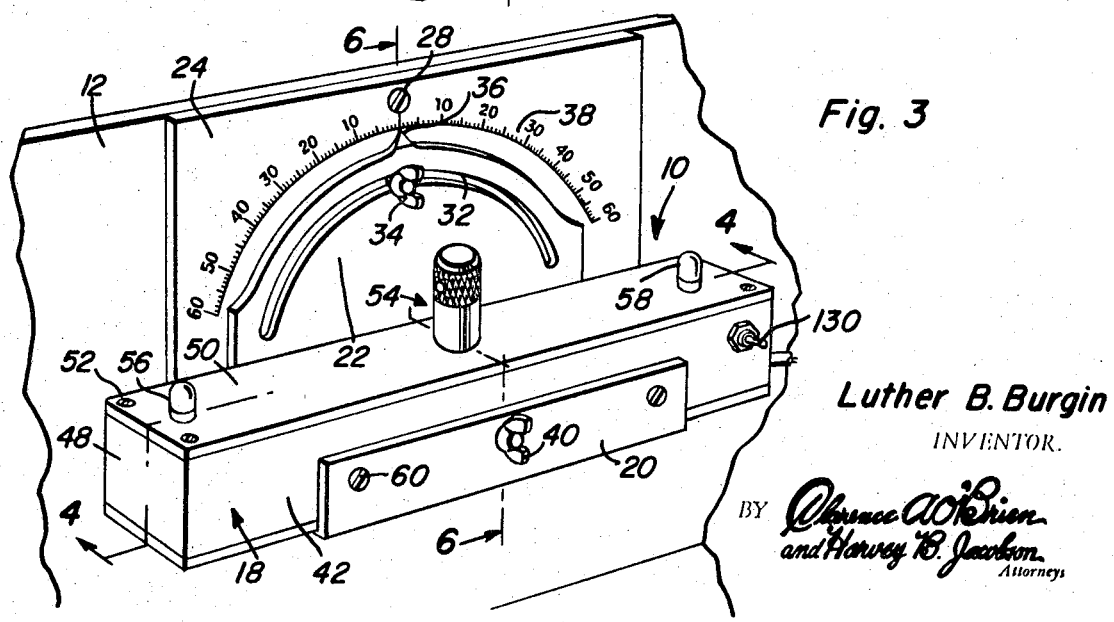
FIG. 3 is a perspective view of the installed position sensing device of the present invention.

As more clearly seen in FIGS. 3 and 6, the position controlling switch device 10 is enclosed within an outer, elongated housing 18 projecting longitudinally from opposite ends of a bracket 20 by means of which the housing is secured to an angularly adjustable plate member 22 so that the position controlling device 10 may be adjusted to a level position for any desired angular position of the blade with which it is associated. The plate member 22 is therefore pivotally mounted on a dial plate 24 by means of the pivot stud 26, the dial plate 24 being secured to the mounting plate 12 by fastener 28 for example. Secured to the dial plate 24, is a threaded stud 30 which projects through an arcuate slot 32 formed in the plate member 22 so that the plate member may be locked in any selected angular position by means of the wing nut 34. The plate member 22 is therefore provided with a pointer 36 which cooperates with a protractor scale 38 formed on the dial plate 24. Thus, the plate member 22 together with the housing 18 carried thereon by means of the bracket 20, may be angularly displaced to a desired position and locked in such position. The housing 18 is therefore held in an aligned position on the bracket 20 and releasably locked thereto in this position by means of the locking element 40 extending through the bracket 20 and being threadedly received within the housing 18.

Referring now to FIGS. 4, 5, 6 and 7, it will be observed that the housing 18 includes a front wall 42, and a back wall 44 abutting the plate member 22, the front and back walls being interconnected by the end walls 46 and a bottom wall 48. The housing is closed by a top wall 50 secured by means of the fasteners 52 to the end walls 48. The top wall 50 mounts a sensitivity selector device generally referred to by reference numeral 54 and a pair of directional indicator lamps 56 and 58. The housing is also aligned on its mounting bracket 20 by means of a pair of alignment pins 60 (FIG. 3) which extend therethrough, and received through apertures in the bracket 20 on opposite sides of the lock element 40.

Fixedly mounted within the outer housing 18, is a nonconductive container 62 within which a body of conductive liquid such as mercury 64 is enclosed. A chamber 66 is therefore formed internally of the container for the mercury of such a shape as to amplify displacement of the mercury in the direction in which the device 10 is angularly displaced with the blade. The chamber 66 is provided with symmetrical bottom wall surfaces 68 which extend downwardly from opposite ends 70 of the container toward a central location at which the depth of the body of mercury is greatest to lower the center of gravity of the body of liquid. The surfaces include shallow slope portions 67 adjacent the ends and steep slope portions 69. The chamber 66 is also defined between side walls 72 which diverge from the ends 70 of the container toward the central location aforementioned at which the walls are spaced apart a maximum distance, as shown in FIG. 5. The chamber 66 is closed by means of a top closure lid 74 secured by fasteners to the botom portion of the container mounting level regulating inserts 76 formed with air vent slots 78 to prevent pressure and vacuum pockets in the mercury when the device is displaced from a level position. It will be apparent therefore that the upper surface of the body of liquid 64 will extend longitudinally into close spaced relation to the ends 70 of the container and that when the container is angularly displaced in a plane substantially parallel to its longitudinal axis, the spacing of the liquid from one end and from the top wall 74 adjacent said end will be reduced. Also, the reduction in this spacing will be produced by a directionally amplified displacement of the liquid inasmuch as the volume of the liquid adjacent the end portions of the container is reduced relative to the central portion because of the cross-sectional configuration of the chamber 66 as hereinbefore described.

The ends 70 of the container 62 are provided with sealing plugs 80 through which end contact elements 82 and 84 extend into the chamber 66 in close spaced relation to the body of liquid when disposed in a level position as shown in FIG. 4. Also, a pair of contact elements 86 project into the body of liquid through sealing plugs 88 in the side wall 72 of the chamber. It will be appreciated therefore, that a conductive path is established between the contact elements 86 and one of the contact elements 82 or 84 when the container 62 is angularly displaced in one direction or the other. However, in order to prevent establishment of a conductive path between the contact elements because of splashing of the liquid during forward movement of the vehicle on which the device is mounted, baffles 90 are formed on the closure lid 74 and project downwardly from the top wall 74 into close spaced relation to the bottom wall surface 68. Slots 75 are formed in the baffles 90 aligned with slots 78 to form a restricted flow passage. Also projecting from the top wall are slotted end baffles 91 at the juncture of the slope portions 68 and 69 of the bottom surface. Each baffle 91 is provided with a lower portion of reduced thickness through which an aperture 93 is formed for restricted flow of mercury. The baffles 91 thus act as dampeners without separating the mercury.

Also mounted within the outer housing 18 below the container 62, is a non-conductive enclosure 92 within which a pair of longitudinally spaced mounting projections 94 are formed for mounting a pair of time delay relays 96 and 98. Each of the relays includes therefore, a heating element 100 and a thermally operated, normally opened switch 102 mounted by the projection 94 and enclosed within a casing 104 as shown in FIG. 4. The relays 96 and 98 are wired to the contact elements 82 and 84 and electrical leads extend from the relays, and the indicator lamps 56 and 58 into an electrical cable 106 which extends out of the housing 18 for connection to a source of current and to a reversible control device through which the blade may be correctively repositioned by the blade positioning mechanism associated therewith.

As more clearly seen in FIGS. 4 and 6, the selective sensitivity control 54 includes a tubular projection 108 fixed to the top wall 74 supporting a bearing sleeve 110 to rotatably mount an externally knurled selector knob 112. A threaded bore 118 is formed in the knob threadedly receiving an axially movable screw 120 rotatably mounted by bearing sleeve 114 in the tubular projection 108. The screw member 120 is connected at its inner end to a liquid displacing element 122 partially submerged within the liquid in container 62. The element closely fits between the side walls 72 and the baffles 90 so as to prevent rotation of the screw member 120 to which it is connected. It will be apparent therefore, that upon rotation of the selector knob 112, the screw member 120 and the element 122 connected thereto will be axially displaced in one or the other direction in order to vary the quantity of liquid 64 displaced by the partially submerged element 122. In this fashion, the vertical spacing between the upper surface of the body of liquid and to top wall 74 as well as the longitudinal extent of the liquid 64 may be varied in order to change the spacing of the liquid from the contact elements 82 and 84 and the sensitivity of the position controlling device.

With reference to FIG. 8, operation of the position sensing device as hereinbefore described will become apparent. It will be noted therefore, that the pair of contact elements 86 are connected to a source of current such as the positive terminal of battery 126 by means of the conductor 128. The negative terminal of the battery 126 on the other hand is connected to both of the indicator lamps 56 and 58 through an indicator cutout switch 130 which may be mounted on the housing 18 as shown in FIG. 3. Energizing circuits may therefore be completed through the indicator lamps when a conductive path is established between the contact elements 86 and one or the other of the contact elements 82 or 84 through the body of liquid 64, the contact elements 82 and 84 therefore being respectively connected to the indicator lamps by conductors 132 and 134. The conductors 132 and 134 are also connected to the relays 96 and 98 respectively in order to complete an energizing circuit through the heater elements 100 associated therewith simultaneously with illumination of an associated indicator lamp 56 or 58. The heater elements of the relays are therefore both connected to the negative terminal of the battery 126 through a solenoid cut out switch 136 as shown in FIG. 8. It will be apparent therefore, that after the heater element of one or the other of the relays is energized, the associated thermal switch 102 will close after elapse of a predetermined period of time and thereby complete an energizing circuit through one of the two solenoid coils 138 and 140. The solenoid coils are wound in opposite directions so as to effect displacement of a plunger 142 in opposite directions in order to control a reversing gear mechanism 144 for example through which angular movement is imparted to the blade in opposite directions. Once the position of the blade is restored therefor, the conductive paths between the contact elements in the position controlling device are opened so as to de-energize the solenoid through which corrective displacement of the blade is effected. By opening the indicator cutout switch 130, the indicator lamps which indicate operation of the position controlling device in one direction or the other will be disabled. On the other hand, if corrective displacement of the blade is not desired, the cutout switch 136 may be opened to prevent energization of the solenoid coils 138 and 140. The solenoid coils while described in connection with a gear mechanism, may of course be associated with other types of corrective control mechanisms.

From the foregoing description, the operation, construction and utility of the position controlling device of the present invention will be apparent. It will be appreciated therefore, that the position controlling device will be particularly useful in connection with grading machines and since it does not involve any moving parts, it may better withstand the severe physical conditions of its intended installation as well as the adverse effects of moisture and atmospheric conditions. Further, the device may be easily mounted on different types of equipment and because of its delay action will maintain a close grade when utilized in connection with road graders.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A blade angle control device for grading machines comprising, a non-conductive container having a chamber enclosing a body of conductive liquid, said chamber varying in vertical depth and horizontal width from a minimum value at opposite longitudinal ends to a maximum value intermediate said ends, a contact element mounted by the container within said body of liquid intermediate said ends of the chamber, a pair of end contacts mounted by the container at said ends of the chamber closely spaced from said body of liquid in a level position of the container, and liquid displacing means adjustably mounted by the container for submergence within the liquid to vary the depth and longitudinal extent of said body of liquid within the chamber.

2. The combination of claim 1 including longitudinally spaced baffle members mounted by the container and projecting into the body of liquid within the chamber to prevent splashing of the liquid.

3. The combination of claim 2 including a source of electrical current connected to said contact element, indicator lamps connected between said source and the end contacts, time delay means connected in parallel with each of said indicator lamps for energization thereof simultaneously with illumination of said lamps, and reversible control means connected to the relay means for operation in delayed response to contact between said body of liquid and one of the end contacts.

4. The combination of claim 1 including a source of electrical current connected to said contact element, indicator lamps connected between said source and the end contacts, time delay relay means connected in parallel with each of said indicator lamps for energization thereof simultaneously with illumination of said lamps, and reversible control means connected to the relay means for operation in delayed response to contact between said body of liquid and one of the end contacts.

5. A blade angle control device for grading machines comprising, a non-conductive container having a horizontally elongated chamber formed by a bottom wall inclined downwardly from opposite ends of the container to a central location, side walls diverging from said ends to said central location, and a horizontal top wall, liquid level regulating means mounted on said top wall, a body of conductive liquid within said chamber having an upper surface spaced below said top wall and extending longitudinally toward said ends of the container, a pair of end contacts projecting into said container at said ends closely spaced from said body of liquid when the upper surface thereof is substantially parallel to the top wall, a contact element projecting into said body of liquid from one of the side walls, a liquid displacing element centrally positioned by the top wall in adjustably spaced relation above the bottom wall, and selective positioning means connected to said liquid displacing element for varying the amount of liquid displaced thereby to change the spacing of said upper surface of the body of liquid relative to the end contacts when parallel to the top wall.

6. The combination of claim 5 including baffle members mounted by the top wall and projecting into the body of liquid in spaced relation above the bottom wall, said baffles being provided with slots aligned with the level regulating means to form a restricted flow passage.

7. The combination of claim 6 including a source of electrical current connected to said contact element, indicator lamps connected between said source and the end contacts, time delay relay means connected in parallel with each of said indicator lamps for energization thereof simultaneously with illumination of said lamps, and reversible control means connected to the relay means for operation in delayed response to contact between said body of liquid and one of the end contacts.

8. The combination of claim 5 including a source of electrical current connected to said contact element, indicator lamps connected between said source and the end contacts, time delay relay means connected in parallel with each of said indicator lamps for energization thereof simultaneously with illumination of said lamps, and reversible control means connected to the relay means for operation in delayed response to contact between said body of liquid and one of the end contacts.

9. The combination of claim 5 wherein said bottom wall of the chamber includes at least two portions of different slope, the portions of shallowest slope extending downwardly from the ends of the chamber toward said central location.

10. The combination of claim 9 including baffle members mounted by the top wall and projecting into the body of liquid in spaced relation above the bottom wall, said baffles being provided with slots aligned with the level regulating means to form a restricted flow passage.

11. The combination of claim 10 wherein at least one of said baffles is provided with a restricted flow aperture at the juncture between said slope portions of the bottom wall.

References Cited

UNITED STATES PATENTS

| 1,007,998 | 11/1911 | Whalton | 33—206UX |
| 1,600,121 | 9/1926 | Mazade | 33—206UX |
| 2,438,758 | 3/1948 | Leach | 33—206UX |
| 2,532,883 | 12/1950 | Bennett et al. | 33—206UX |
| 2,750,583 | 6/1956 | McCullough | 340—282X |
| 2,838,844 | 6/1958 | Sackett | 200—61.52X |
| 2,893,134 | 7/1959 | Shea et al. | 33—206 |
| 3,204,233 | 8/1965 | Olliff | 340—282 |
| 3,363,231 | 1/1968 | Grosgebauer et al. | 340—52 |
| 2,284,550 | 5/1942 | Adams | 172—4.5 |
| 2,734,293 | 2/1956 | Barnes | 172—4.5 |
| 3,264,959 | 8/1966 | Shea | 172—4.5UX |

ALVIN H. WARING, Primary Examiner

D. L. TRAFTON, Assistant Examiner

U.S. Cl. X.R.

33—206.5; 172—4.5; 200—61.47